Figure 4:
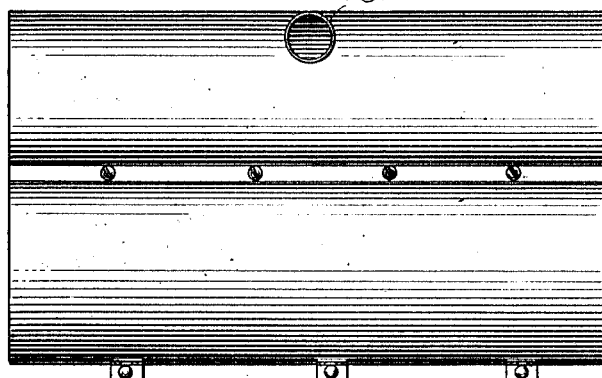
Figure 5:
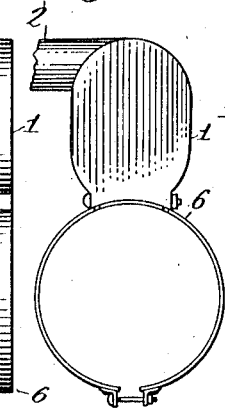
Figure 6:
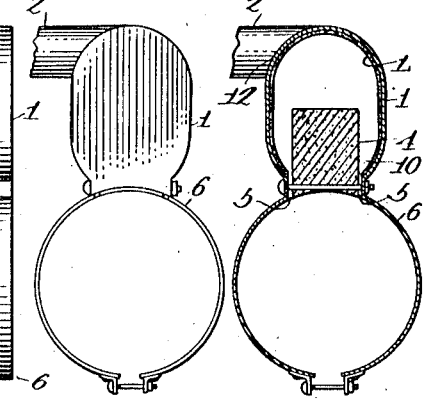
Figure 7:
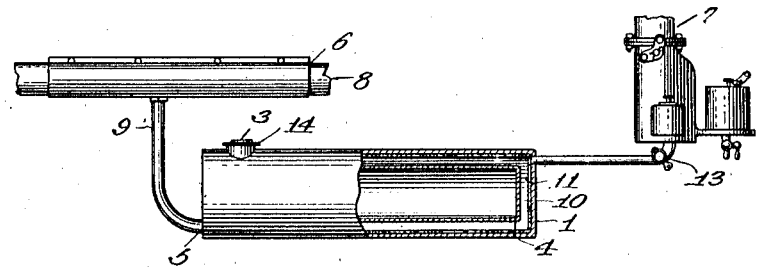
Figure 8:
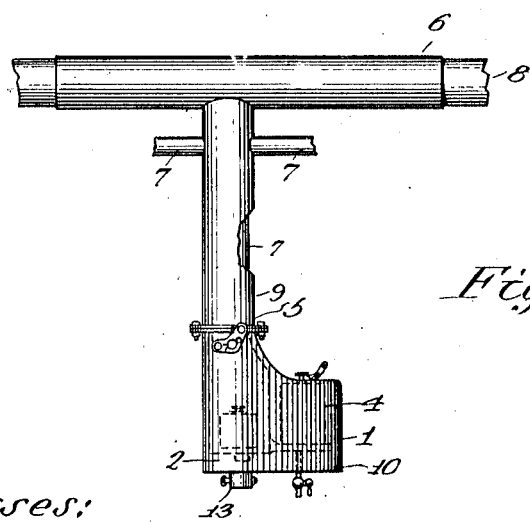

O. L. PAGE.
HEATING DEVICE FOR CARBURETERS.
APPLICATION FILED MAR. 20, 1911.
1,048,576.
Patented Dec. 31, 1912.
2 SHEETS—SHEET 1.
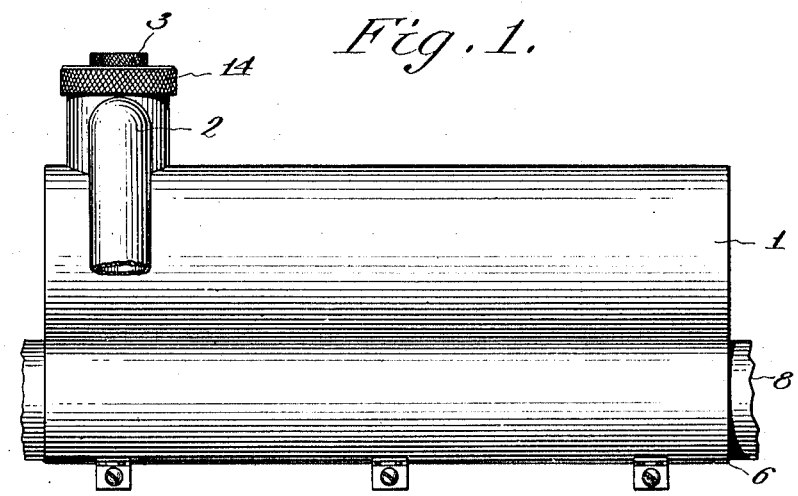
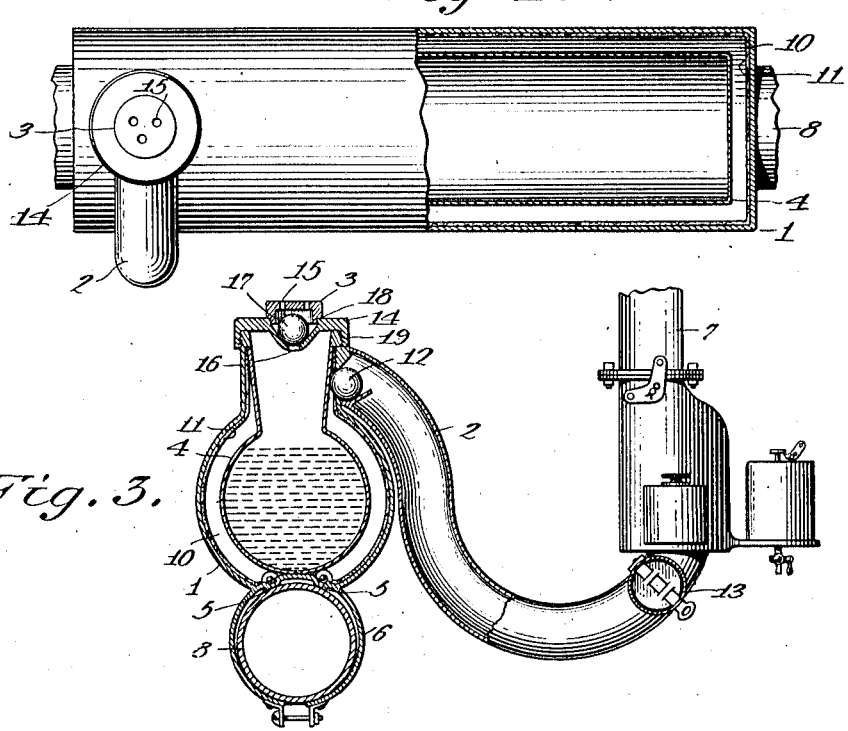

O. L. PAGE.
HEATING DEVICE FOR CARBURETERS.
APPLICATION FILED MAR. 20, 1911.

1,048,576.

Patented Dec. 31, 1912.
2 SHEETS—SHEET 2.

Witnesses:
Seymour Mowers
E. L. Dougherty

Inventor.
Orville L. Page

UNITED STATES PATENT OFFICE.

ORVILLE L. PAGE, OF DES MOINES, IOWA.

HEATING DEVICE FOR CARBURETERS.

1,048,576.  Specification of Letters Patent.  Patented Dec. 31, 1912.

Application filed March 20, 1911. Serial No. 615,601.

*To all whom it may concern:*

Be it known that I, ORVILLE L. PAGE, a citizen of the United States, residing at Des Moines, in the county of Polk and State of Iowa, have invented certain new and useful Heating Devices for Carbureters.

My invention relates to carbureting systems for gasolene and other combustion engines and especially to methods of heating the intake to same. Its object is to obviate certain objections in present systems, particularly in cold and damp weather, to which end I construct the same as fully set forth hereinafter and as illustrated in the accompanying drawings, in which similar letters refer to similar parts throughout the several views.

Figure I is a side elevation of the appliance which I have invented; Fig. II is a plan view with a portion of outside and inside tanks torn away; Fig. III is a vertical section through the pipe 2 and valve 3; Fig. IV represents a modification and Figs. V and VI are end elevation and vertical section respectively of the same; Fig. VII is a modification; Fig. VIII is a modification.

Referring to Fig. III it will be noted that the principle of the appliance is in drawing the hot air off from a gasolene or other combustion engine exhaust pipe, around which the sleeve 6 is clamped, and through the valves 5 into an air-tight chamber 10 which has practically non-radiating walls. Inclosed within these non-radiating walls and surrounded by the hot air as it passes through is another inclosed chamber or tank 4 which contains water, oil or other liquid that seems best adapted to the immediate application of the appliance. Oil will not freeze however long the engine remains at rest and has a much higher boiling point than water. After passing through the air chamber 10 and giving up a portion of its heat to the liquid in tank 4, the hot air passes on through pipe 2, which connects directly to air intake of carbureter and from thence the carbureted air takes its usual course into the cylinder of the engine. In tank 1, the walls being practically non-radiating, when air is not being drawn through the tank by the suction intake of the engine, and inlet valve 5 and outlet valve 12 are closed the liquid in tank 4, which has taken up heat from heated air passing through as stated above, retains its heat for a considerable time while the engine is not running. The walls of tank 1 are made non-radiating by lining same with asbestos (11) or other of the well known non-radiating materials. When the engine is started again the liquid in the inner tank 4 gives up its heat to the air passing through the chamber 10 and thus enables one to get good carburetion and a warmed engine in starting in cold or damp weather. When the engine is running again the hot exhaust is again storing heat in tank 4. Undoubtedly the best material to make the appliance of is sheet copper on account of its durability and also it gives tank 4 the necessary sensitiveness to heat absorption and radiation (tank 1 being insulated to produce non-radiation as stated above). The modification as shown in Fig. VII may more readily be made of brass tubing. It will be seen that this method in its application particularly to automobiles and aeroplanes makes possible the easy starting and efficient running in any weather (eliminates the necessity of putting a make-shift adjustment on the carbureter in winter known as enriching the mixture). Within the non-radiating walls of tank 1 a rarefied atmosphere is maintained at a good vaporizing temperature and a good vaporizing temperature is maintained for hours after the engine has ceased to run.

Means is provided for filling tank 4 (Figs. I, II, III, VII) with liquid by removing cap 14 and in this cap covering the opening is a relief valve 3 which allows any excessive pressure to be relieved. Aside from the automatic working of tank 4 (Figs. I, II, III, VII) in absorbing heat from the exhaust and giving it up to the cold engine, the appliance may be used as well beyond its automatic limit of heat retaining by simply pouring hot water or other liquid into tank 4 and thus warm air may be drawn directly into carbureter and engine cylinder as in the automatic operation.

Numeral 13 indicates a butterfly valve which is of the same type as the usual intake throttle valve at outlet of carbureter to engine. This butterfly valve opens to the atmosphere so that air may be taken directly from the atmosphere at any time desired. This application of a valve at this point makes it unnecessary to disconnect the apparatus during warm weather. Even in warm weather there are damp days when the appliance is effective.

Valves 3, 5 and 12 are all of the same design, namely, of a ball which is carried back into its seat over the outlet by its own weight and the ball's displacement, due to the suction intake of the engine, is limited so that it is bound to drop back in the valve seat. The number of valves (5) along exhaust pipe is so that these inlets are equal to or greater in capacity than valve 12.

16 and 15 indicate the ports in the relief valve of which there are four—one of the former and three of the latter. The valve and cap is made up of three parts—cap 14 with a screw thread at 19, ball 17 and valve 3 with a screw thread at 18.

Figs. IV, V and VI illustrate a modification showing that I do not confine myself to a liquid filled tank to absorb and radiate the heat in the air-tight chamber 10, but may use a solid substance 4, Fig. VI, such as soapstone or the like. It will be noted that the solid substance 4, Fig. VI has the same relative position in the tank 1 as the liquid tank 4 Fig. III. The valve arrangement for the intake of air from the exhaust pipe is also the same as in Fig. III so that the hot air is made to pass over the surface of the solid substance.

Fig. VII illustrates a modification showing that I do not confine myself to any particular location of the tanks that go to make up the appliance as they may be either directly on the exhaust pipe, as in Figs. I, II, and III with pipe to carbureter, or as in this illustration the tanks may be close to the carbureter with pipe joining exhaust sleeve to same.

Fig. VIII illustrates a modification in which the inner heat absorbing and radiating tank 4 is the carbureter itself. The pipe joining exhaust sleeve 6 and air chamber tank 1 forms a sleeve around the engine intake pipe 7 and thus increases the efficiency of the heated intake. In this method (embodying the same principle as in previous figures) the heated air from the exhaust pipe is drawn to the bottom of tank 1 (carbureter jacket) and enters the carbureter air intake at 2.

It will readily be seen why the carbureter is made to take air off of the bottom of tank 1 (carbureter jacket). The constant displacing of the air at that point by the suction intake of the engine when the engine is running causes all the air above that point of intake to circulate downward and be displaced by heated air from the exhaust pipe. This movement downward produces the necessary hot air circulation over the surface of tank 4 (float chamber) and the result is the same as in the other applications of the principle. Tank 1 (carbureter jacket) is lined with non-conducting material in the same manner as shown in Figs. II, III, VI, VII.

What I claim is:

In an internal combustion engine intake heater, a sleeve adapted to surround the exhaust pipe of the engine, a carbureter connected to the suction intake of the engine, an air-tight chamber with non-radiating walls between the carbureter and the sleeve, a valve connection between the sleeve and the air-tight chamber, a heat absorbing and radiating substance in the air-tight chamber, a valve connection from said air-tight chamber to the air intake of the carbureter, said inlet and outlet valves to the said air-tight chamber being so constructed that they will remain closed except when air is being drawn through by the suction intake of the engine, substantially as set forth.

In testimony whereof I have signed this specification in the presence of two subscribing witnesses.

ORVILLE L. PAGE.

Witnesses:
SEYMOUR MOWERS,
J. E. RISSE.